US009904592B2

(12) United States Patent
Royer, Jr. et al.

(10) Patent No.: US 9,904,592 B2
(45) Date of Patent: Feb. 27, 2018

(54) MEMORY LATENCY MANAGEMENT

(71) Applicant: Intel Corporation, Santa Clara, CA (US)

(72) Inventors: Robert J. Royer, Jr., Portland, OR (US); Blaise Fanning, Folson, CA (US); Eng Hun Ooi, Georgetown (MY)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/775,848

(22) PCT Filed: Feb. 26, 2014

(86) PCT No.: PCT/US2014/018513
§ 371 (c)(1),
(2) Date: Sep. 14, 2015

(87) PCT Pub. No.: WO2014/163880
PCT Pub. Date: Oct. 9, 2014

(65) Prior Publication Data
US 2016/0034345 A1    Feb. 4, 2016

(30) Foreign Application Priority Data

Mar. 13, 2013    (MY) .......................... PI 2013000863

(51) Int. Cl.
*G11C 29/00*    (2006.01)
*G06F 11/10*    (2006.01)
(Continued)

(52) U.S. Cl.
CPC ...... *G06F 11/1064* (2013.01); *G06F 11/1048* (2013.01); *G06F 12/0866* (2013.01);
(Continued)

(58) Field of Classification Search
CPC ............. G06F 11/1064; G06F 11/1048; G06F 12/0866; G06F 12/084; G06F 2212/1032; G06F 2212/313
See application file for complete search history.

(56) References Cited

U.S. PATENT DOCUMENTS 7,636,813 B2    12/2009   Tremaine
7,958,430 B1     6/2011   Kolokowsky
(Continued)

FOREIGN PATENT DOCUMENTS

EP    1538525      6/2005
GB    2449348     11/2008
(Continued)

OTHER PUBLICATIONS

International Preliminary Report on Patentablity received for International Application No. PCT/US2014/018513, dated Sep. 24, 2015.
International Search Report and Written Opinion received for PCT Application No. PCT/SU2014/018513, dated Jun. 24, 2014, 10 pages.

*Primary Examiner* — Sam Rizk
(74) *Attorney, Agent, or Firm* — Thorpe North & Western, LLP

(57) ABSTRACT

Apparatus, systems, and methods to manage memory latency operations are described. In one embodiment, an electronic device comprises a processor and a memory control logic to receive data from a remote memory device, store the data in a local cache memory, receive an error correction code indicator associated with the data, and implement a data management policy in response to the error correction code indicator. Other embodiments are also disclosed and claimed.

8 Claims, 8 Drawing Sheets

(51) Int. Cl.
   *G06F 12/0866* (2016.01)
   *G06F 12/084* (2016.01)
(52) U.S. Cl.
   CPC .... *G06F 12/084* (2013.01); *G06F 2212/1032* (2013.01); *G06F 2212/313* (2013.01)

(56) References Cited

U.S. PATENT DOCUMENTS

| | | |
|---|---|---|
| 8,171,251 B2 | 5/2012 | Ziv et al. |
| 2007/0104327 A1 | 5/2007 | Macri |
| 2007/0220354 A1 | 9/2007 | Moyer |
| 2008/0082872 A1 | 4/2008 | Nagasaka |
| 2009/0113272 A1 | 4/2009 | Tan et al. |
| 2010/0023800 A1* | 1/2010 | Harari ............... G06F 11/1068 714/2 |
| 2010/0162037 A1 | 6/2010 | Maule et al. |
| 2011/0084248 A1* | 4/2011 | Hsieh ............... G11C 13/0007 257/4 |
| 2013/0061111 A1 | 3/2013 | Sarcone |

FOREIGN PATENT DOCUMENTS

| | | |
|---|---|---|
| JP | H03-41537 | 2/1991 |
| JP | H04-25954 | 1/1992 |
| JP | 2000-305861 | 11/2000 |
| JP | 4511618 B2 | 7/2010 |
| RU | 2004128074 A | 5/2005 |
| WO | WO 2010/129305 A1 | 11/2010 |
| WO | 2014/163880 A1 | 10/2014 |

\* cited by examiner

MEMORY LATENCY MANAGEMENT

FIELD

The present disclosure generally relates to the field of electronics. More particularly, some embodiments of the invention generally relate to memory latency management.

BACKGROUND

Some memory systems may be implemented using local, fast-access memory which is frequently embodied as a volatile memory and which may function as a cache memory and one or more remote memory devices which may comprise nonvolatile memory, e.g., e.g., phase change memory, NAND memory or the like or even magnetic or optical memory.

Remote memory devices have higher latency than local cache memory, which negatively affects system performance. Accordingly, techniques to improve latency may find utility.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
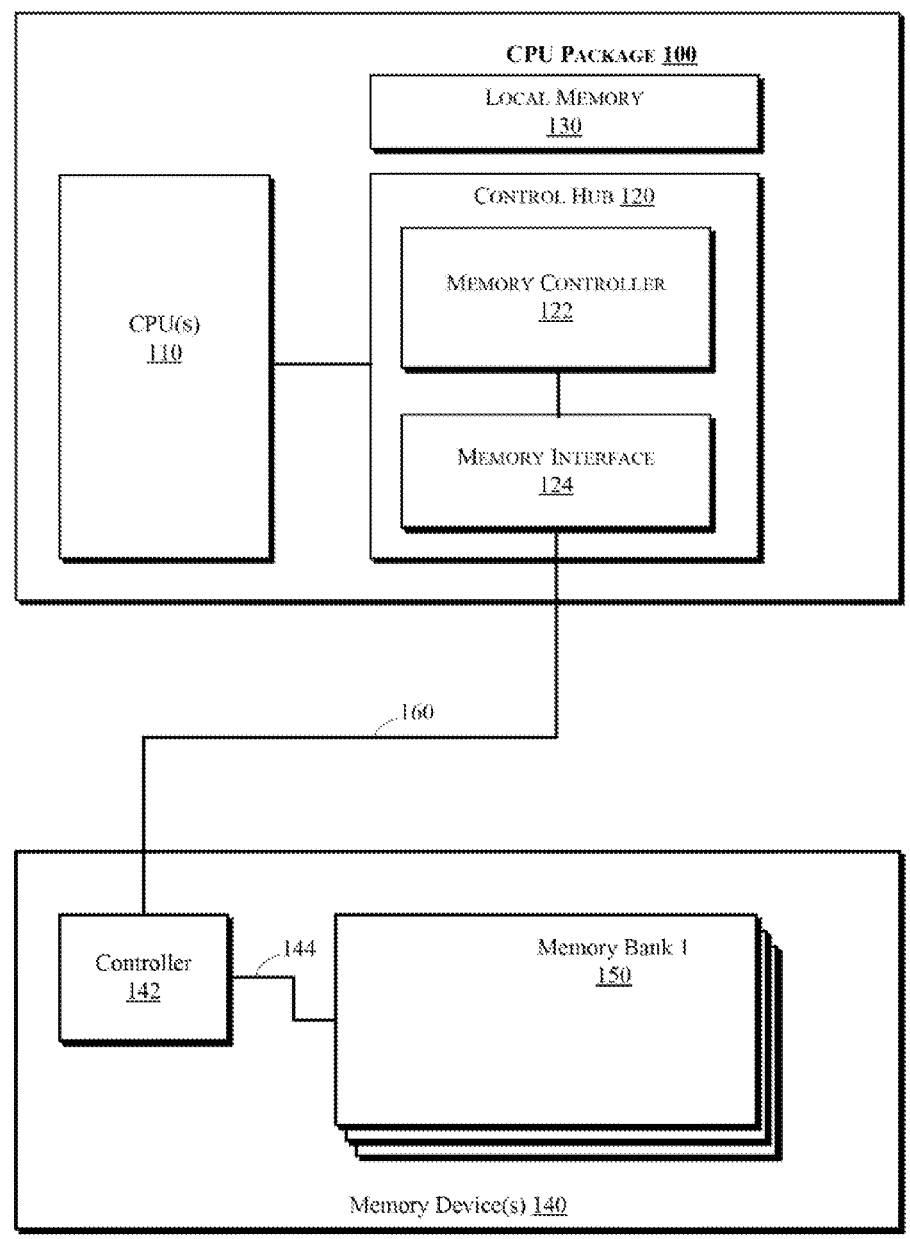
FIG. 1 is a schematic, block diagram illustration of components of apparatus to implement memory latency management in accordance with various embodiments discussed herein.

Some memory systems may be implemented using local, fast-access memory which is frequently embodied as a volatile memory and which may function as a cache memory and one or more remote memory devices which may comprise nonvolatile memory, e.g., dynamic random access memory or even magnetic or optical memory. By way of example, remote memory devices may comprise one or more direct in-line memory modules (DIMMs), each of which may comprise one or more memory ranks which in turn may comprise one or more Dynamic Random Access Memory (DRAM) chips or may include nonvolatile memory, e.g., phase change memory, NAND memory or the like. Some electronic devices (e.g., smart phones, tablet computers, and the like) may comprise simpler remote memory systems comprised of one or more DRAMs.

Remote memory devices may implement error correction code (ECC) algorithms to detect and correct read errors. Exemplary ECC algorithms include BCH error correction code and Reed-Solomon algorithms. Such ECC algorithms introduce additional latency into read operations implemented by the remote memory device(s). In various embodiments, the techniques described herein reduce such latency by allowing the remote memory device(s) to return data obtained during a read operation before the ECC algorithm is completed by pipelining the ECC correction logic with the data transfer to the host. The controller which originated the data request may be configured to store the data received from the remote memory device(s) in a local memory while waiting for an ECC indicator from the remote memory device. In the event that the ECC algorithm implemented by the remote memory device detects no errors in the data the remote memory device forwards an ECC indicator which indicates that the data is good and the controller which originated the data request may process the data. By contrast, in the event that the ECC algorithm implemented by the remote memory device detects errors in the data the remote memory device forwards an ECC indicator which indicates that the data is faulty and the controller which originated the data request waits to receive corrected data before proceeding to process the data.

The techniques discussed herein may be provided in various computing systems (e.g., including servers, desktops, notebooks, smart phones, tablets, portable game consoles, etc.) which may include a memory system comprising multiple DRAM chips commonly assembled into a dual in-line memory module (DIMM) and nonvolatile memory, e.g., phase change memory or NAND memory. In such embodiments, each DRAM may comprise separate refresh control logic. Alternatively, refresh control logic may be implemented at the DIMM level to control operations for multiple DRAMs in a DIMM.

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof.

FIG. 1 is a schematic, block diagram illustration of components of apparatus to implement memory latency management in accordance with various embodiments discussed herein. Referring to FIG. 1, in some embodiments a central processing unit (CPU) package 100 which may comprise one or more CPUs 110 coupled to a control hub 120 and a local memory 130. Control hub 120 comprises a memory controller 122 and a memory interface 124.

Memory interface 124 is coupled to one or more remote memory devices 140 by a communication bus 160. Memory device 140 may comprise a controller 142 and one or more memory banks 150. In various embodiments, memory banks 150 may be implemented using nonvolatile memory, e.g., phase change memory, NAND (flash) memory, ferroelectric random-access memory (FeTRAM), nanowire-based nonvolatile memory, memory that incorporates memristor technology, a static random access memory (SRAM), three dimensional (3D) cross point memory such as phase change memory (PCM), spin-transfer torque memory (STT-RAM) or NAND memory. By way of example, in some embodiments the memory device(s) 140 may comprise one or more direct in-line memory modules (DIMMs) coupled to a memory channel 144 which provides a communication link to controller 142. The specific configuration of the memory bank(s) 150 in the memory device(s) 140 is not critical.

Figure 2:
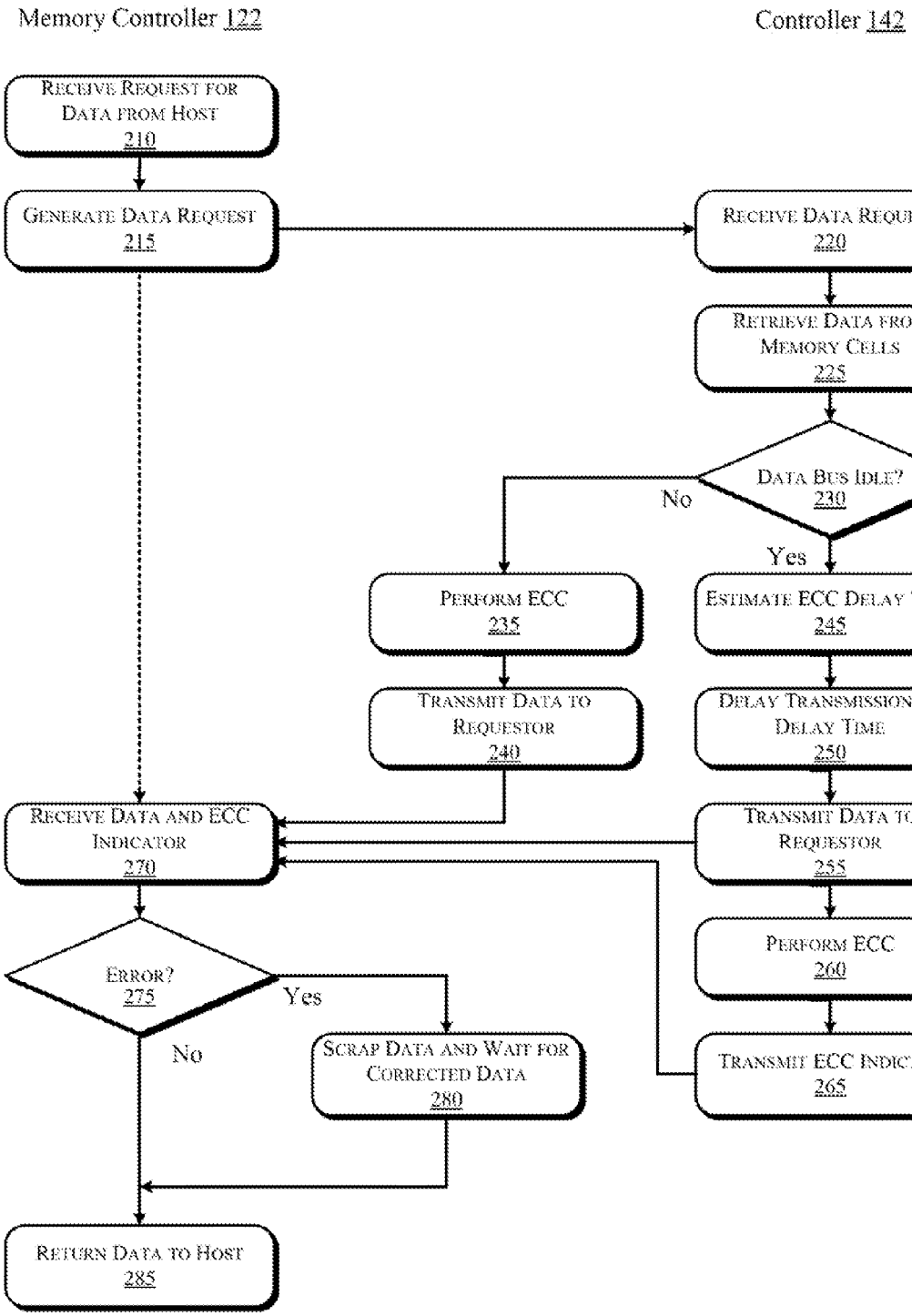
FIG. 2 is a flowchart illustrating operations in a method to implement memory latency management in accordance with various embodiments discussed herein.

As described above, in some embodiments logic in the memory controller 122 cooperates with the logic in the controller 142 in the memory device(s) to manage memory latency associated with read operations in memory device(s) 140. Operations implemented by memory controller 122 and the controller 142 will be described with reference to FIG. 2. Referring to FIG. 2, at operation 210 the memory controller 122 receives a request for data from a host, e.g., from an application executing on CPU 110 or another processor coupled to control hub 120. At operation 215 the memory controller 122 generates a data request for the data requested by the application. The data request is forwarded to the controller 142 in the memory device(s) 140 via the memory interface 124 and the bus 160.

At operation 220 the controller 142 receives the data request, and at operation 225 the controller 142 retrieves the data associated with the data request from the memory bank(s) 150. At operation 230 the controller 142 determines whether the bus 160 is idle. If at operation 230 the data bus 160 is not idle (e.g., if the data bus 160 is being used to transmit data) then control passes to operation 235 and the controller 142 implements an ECC algorithm to detect and correct read errors in the data retrieved from the memory bank(s) 150. At operation 240 the data retrieved from the memory bank(s) 150 is transmitted to the memory interface 124 via the bus 160.

At operation 270 the memory controller 122 receives the data via the bus 160. At operation 275 the memory controller 122 evaluates whether the data has read errors. Because the data has already been subjected to an ECC detection and correction operation the data will not have errors so control passes to operation 285 and the data is returned to the host.

Figure 3:
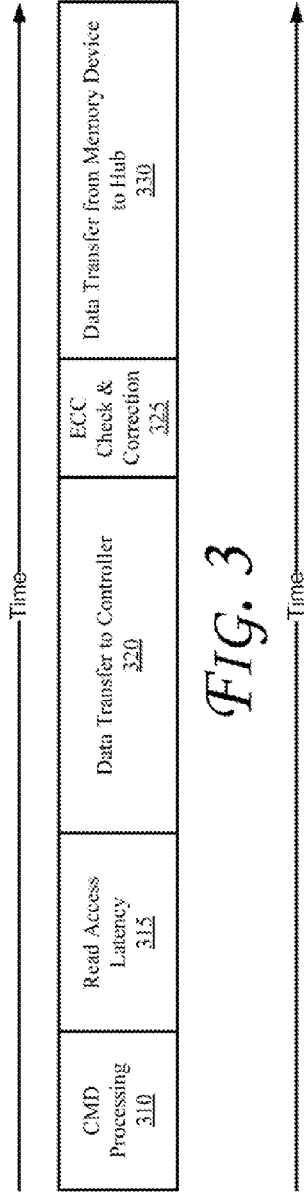
FIGS. 3-5 are schematic illustrations of time lines depicting operations in a method implement memory latency management in accordance with various embodiments discussed herein.

A timeline of latency associated with these operations is illustrated in FIG. 3. Referring to FIG. 3 a first time latency 310 is associated with command processing and a second time latency 315 is associated with the read access latency in reading the data from the memory bank(s) 150. A third latency 320 is associated with the data transfer from the memory bank(s) 150 to the controller 142. A fourth latency 325 is associated with the ECC check and correction procedure 325. A fifth latency is associated with the data transfer from the memory device(s) 140 to the control hub 120. The total latency corresponds to the sum of the respective latencies illustrated in FIG. 3.

Referring back to FIG. 2, if at operation 230 the data bus 160 is idle then control passes to operation 245 and the controller 142 estimates a time required to perform an ECC check on the data requested. In some embodiments read operations are of a fixed and known size such that the controller can determine in advance how long the ECC operation will take.

At operation 250 the controller 142 implements a delay of data transmission by an amount of time corresponding to the ECC delay time determined at operation 245, then at operation 255 the controller 142 initiates data transmission of the requested data from the memory device(s) 140 to the memory interface 124 via the data bus 160. At operation 260 the controller 142 performs an ECC check on the data and at operation 265 the controller 142 transmits an ECC indicator to the memory interface 124 via the data bus.

At operation 270 the memory controller 122 receives the data and an ECC indicator via the bus 160. At operation 275 the memory controller 122 evaluates whether the data has read errors. In one embodiment the controller 142 may transmit a retry or fail ECC indicator when the ECC check determines that one or more read errors has occurred in reading data from the memory bank(s) 150. If at operation 275 an error is not indicated then control passes to operation 285 and the controller 122 returns the data to the host.

Figure 4:
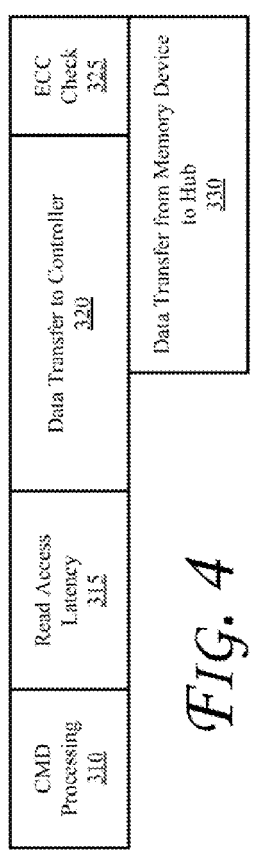

A timeline of latency associated with these operations is illustrated in FIG. 4. Referring to FIG. 4 a first time latency 310 is associated with command processing and a second time latency 315 is associated with the read access latency in reading the data from the memory bank(s) 150. A third latency 320 is associated with the data transfer from the memory bank(s) 150 to the controller 142. As illustrated in FIG. 4, the data transfer from the memory device(s) 140 to the control hub 120 begins while data is being transferred from the memory bank(s) 150 to the controller 142. Thus the latency associated with this operation is removed. A fourth latency 325 is associated with the ECC check procedure 325. The total latency corresponds to the sum of the respective latencies illustrated in FIG. 4.

Referring back to FIG. 2, if at operation 275 an error is indicated then control passes to operation 280 and the controller 122 scraps the data received and waits for the controller 142 to send corrected data before returning the data to the host (operation 285).

Figure 5:
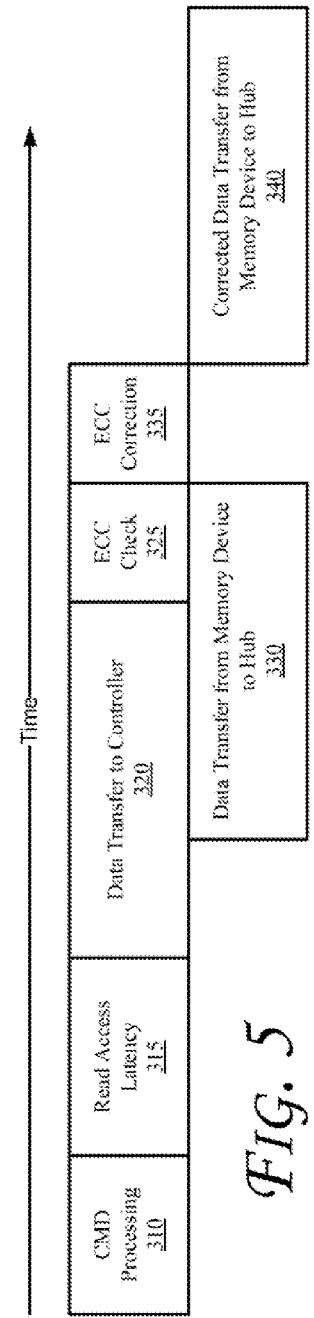

A timeline of latency associated with these operations is illustrated in FIG. 5. Referring to FIG. 5 a first time latency 310 is associated with command processing and a second time latency 315 is associated with the read access latency in reading the data from the memory bank(s) 150. A third latency 320 is associated with the data transfer from the memory bank(s) 150 to the controller 142. As illustrated in FIG. 5, the data transfer from the memory device(s) 140 to the control hub 120 begins while data is being transferred from the memory bank(s) 150 to the controller 142. Thus the latency associated with this operation is removed. A fourth latency 325 is associated with the ECC check and correction procedure 325. A fifth latency 335 is associated with the ECC correction procedure 335 and a sixth latency 340 is associated with the transfer of corrected data from the memory device(s) 150 to the memory banks 150 to the controller 142. The total latency corresponds to the sum of the respective latencies illustrated in FIG. 5.

Figure 6:
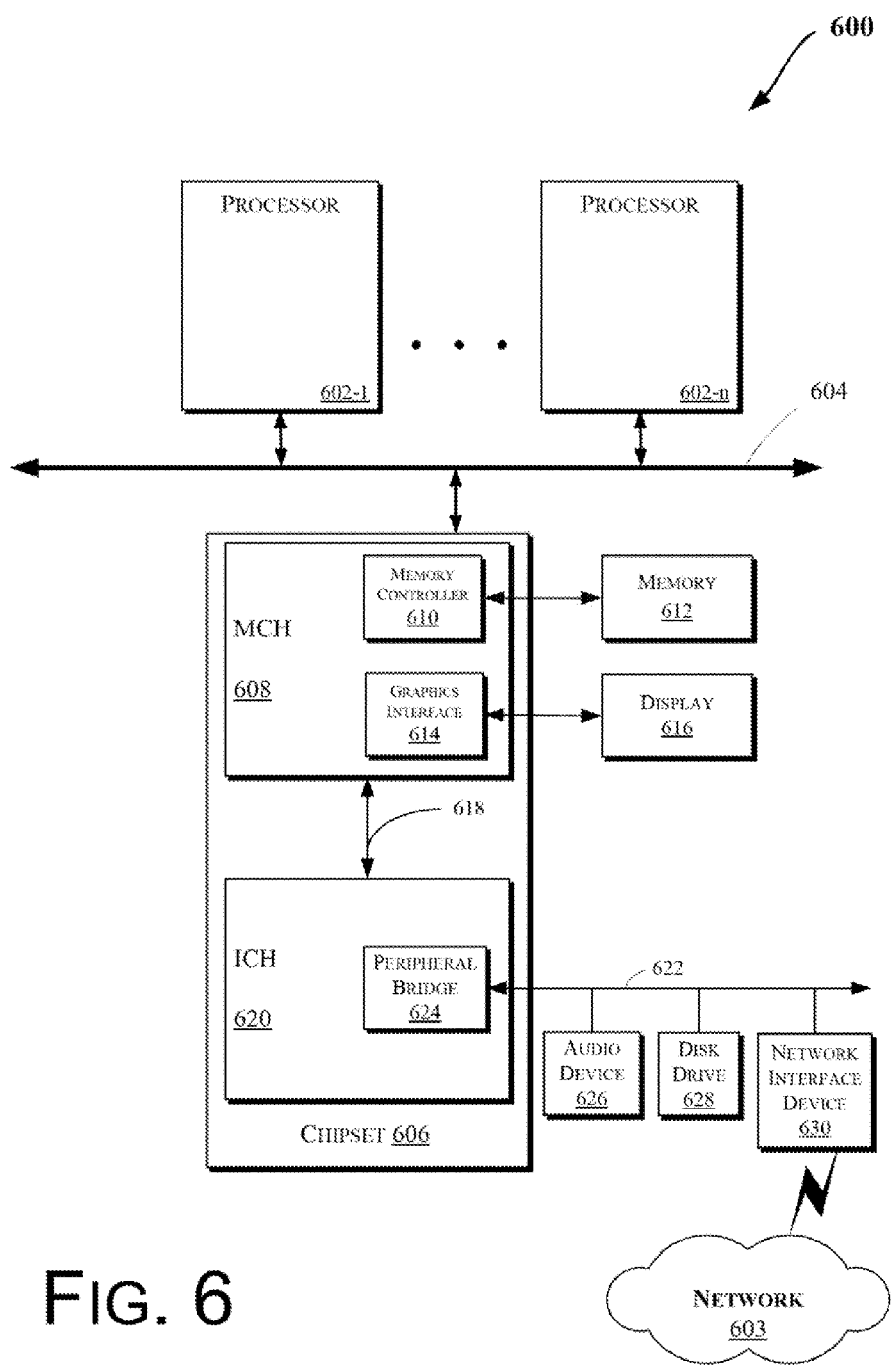
FIGS. 6-10 are schematic, block diagram illustrations of electronic devices which may be adapted to implement memory latency management in accordance with various embodiments discussed herein.

As described above, in some embodiments the electronic device may be embodied as a computer system. FIG. 6 illustrates a block diagram of a computing system 600 in accordance with an embodiment of the invention. The computing system 600 may include one or more central processing unit(s) (CPUs) 602 or processors that communicate via an interconnection network (or bus) 604. The processors 602 may include a general purpose processor, a network processor (that processes data communicated over a computer network 603), or other types of a processor (including a reduced instruction set computer (RISC) processor or a complex instruction set computer (CISC)). Moreover, the processors 602 may have a single or multiple core design. The processors 602 with a multiple core design may integrate different types of processor cores on the same integrated circuit (IC) die. Also, the processors 602 with a multiple core design may be implemented as symmetrical or asymmetrical multiprocessors. In an embodiment, one or more of the processors 602 may be the same or similar to the processors 102 of FIG. 1. For example, one or more of the processors 602 may include the control unit 120 discussed with reference to FIGS. 1-3. Also, the operations discussed with reference to FIGS. 3-5 may be performed by one or more components of the system 600.

A chipset 606 may also communicate with the interconnection network 604. The chipset 606 may include a memory control hub (MCH) 608. The MCH 608 may include a memory controller 610 that communicates with a memory 612 (which may be the same or similar to the memory 130 of FIG. 1). The memory 412 may store data, including sequences of instructions, that may be executed by the CPU 602, or any other device included in the computing system 600. In one embodiment of the invention, the memory 612 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 604, such as multiple CPUs and/or multiple system memories.

The MCH 608 may also include a graphics interface 614 that communicates with a display device 616. In one embodiment of the invention, the graphics interface 614 may communicate with the display device 616 via an accelerated graphics port (AGP). In an embodiment of the invention, the display 616 (such as a flat panel display) may communicate with the graphics interface 614 through, for example, a signal converter that translates a digital representation of an image stored in a storage device such as video memory or system memory into display signals that are interpreted and displayed by the display 616. The display signals produced by the display device may pass through various control devices before being interpreted by and subsequently displayed on the display 616.

A hub interface 618 may allow the MCH 608 and an input/output control hub (ICH) 620 to communicate. The ICH 620 may provide an interface to I/O device(s) that communicate with the computing system 600. The ICH 620 may communicate with a bus 622 through a peripheral bridge (or controller) 624, such as a peripheral component interconnect (PCI) bridge, a universal serial bus (USB) controller, or other types of peripheral bridges or controllers. The bridge 624 may provide a data path between the CPU 602 and peripheral devices. Other types of topologies may be utilized. Also, multiple buses may communicate with the ICH 620, e.g., through multiple bridges or controllers. Moreover, other peripherals in communication with the ICH 620 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 622 may communicate with an audio device 626, one or more disk drive(s) 628, and a network interface device 630 (which is in communication with the computer network 603). Other devices may communicate via the bus 622. Also, various components (such as the network interface device 630) may communicate with the MCH 608 in some embodiments of the invention. In addition, the processor 602 and one or more other components discussed herein may be combined to form a single chip (e.g., to provide a System on Chip (SOC)). Furthermore, the graphics accelerator 616 may be included within the MCH 608 in other embodiments of the invention.

Furthermore, the computing system 600 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 628), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 7:
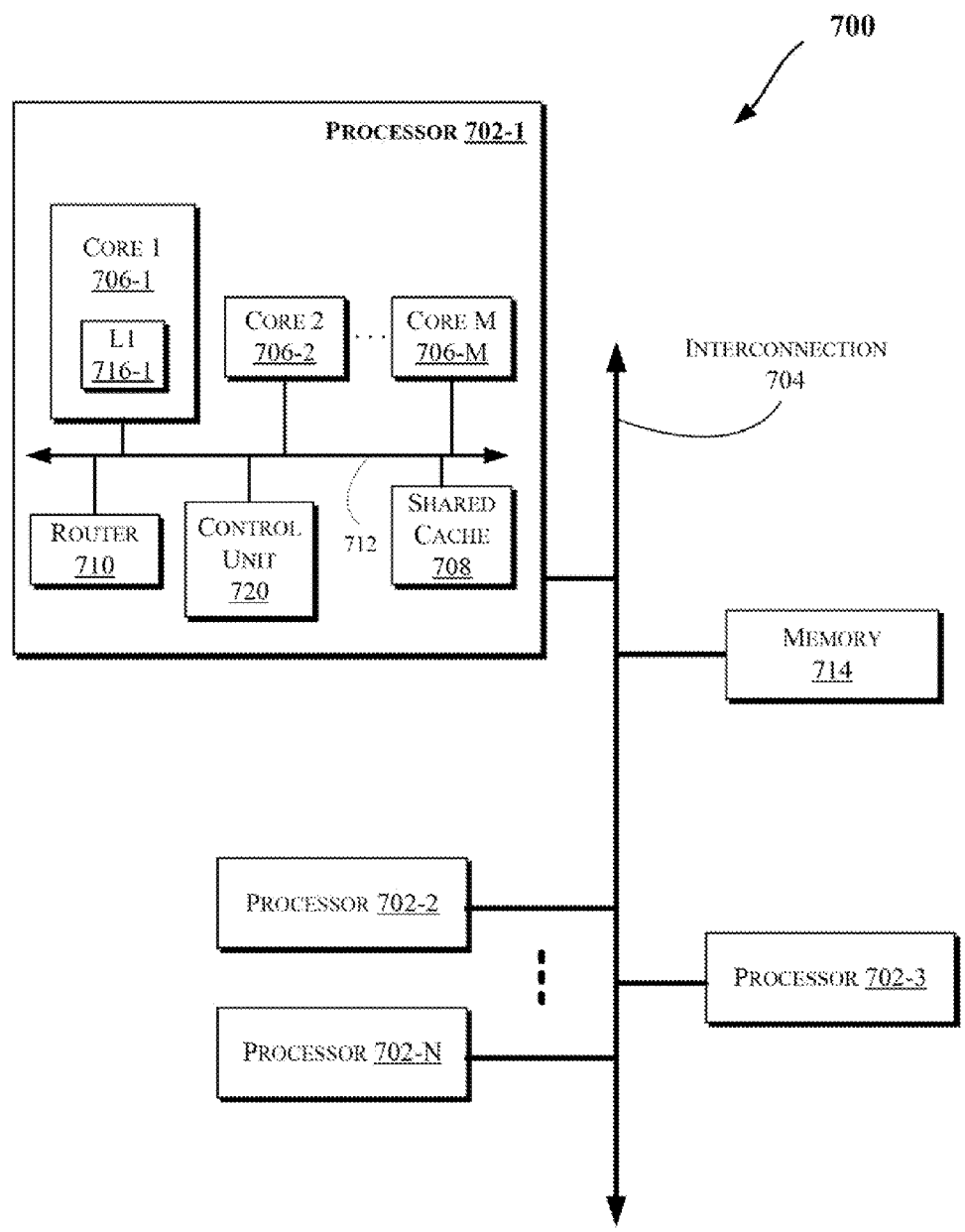

FIG. 7 illustrates a block diagram of a computing system 700, according to an embodiment of the invention. The system 700 may include one or more processors 702-1 through 702-N (generally referred to herein as "processors 702" or "processor 702"). The processors 702 may communicate via an interconnection network or bus 704. Each processor may include various components some of which are only discussed with reference to processor 702-1 for clarity. Accordingly, each of the remaining processors 702-2 through 702-N may include the same or similar components discussed with reference to the processor 702-1.

In an embodiment, the processor 702-1 may include one or more processor cores 706-1 through 706-M (referred to herein as "cores 706" or more generally as "core 706"), a shared cache 708, a router 710, and/or a processor control logic or unit 720. The processor cores 706 may be implemented on a single integrated circuit (IC) chip. Moreover, the chip may include one or more shared and/or private caches (such as cache 708), buses or interconnections (such as a bus or interconnection network 712), memory controllers, or other components.

In one embodiment, the router 710 may be used to communicate between various components of the processor 702-1 and/or system 700. Moreover, the processor 702-1 may include more than one router 710. Furthermore, the multitude of routers 710 may be in communication to enable data routing between various components inside or outside of the processor 702-1.

The shared cache 708 may store data (e.g., including instructions) that are utilized by one or more components of the processor 702-1, such as the cores 706. For example, the shared cache 708 may locally cache data stored in a memory 714 for faster access by components of the processor 702. In an embodiment, the cache 708 may include a mid-level cache (such as a level 2 (L2), a level 3 (L3), a level 4 (L4), or other levels of cache), a last level cache (LLC), and/or combinations thereof. Moreover, various components of the processor 702-1 may communicate with the shared cache 708 directly, through a bus (e.g., the bus 712), and/or a memory controller or hub. As shown in FIG. 7, in some embodiments, one or more of the cores 706 may include a level 1 (L1) cache 716-1 (generally referred to herein as "L1 cache 716"). In one embodiment, the control unit 720 may include logic to implement the operations described above with reference to the memory controller 122 in FIG. 2.

Figure 8:
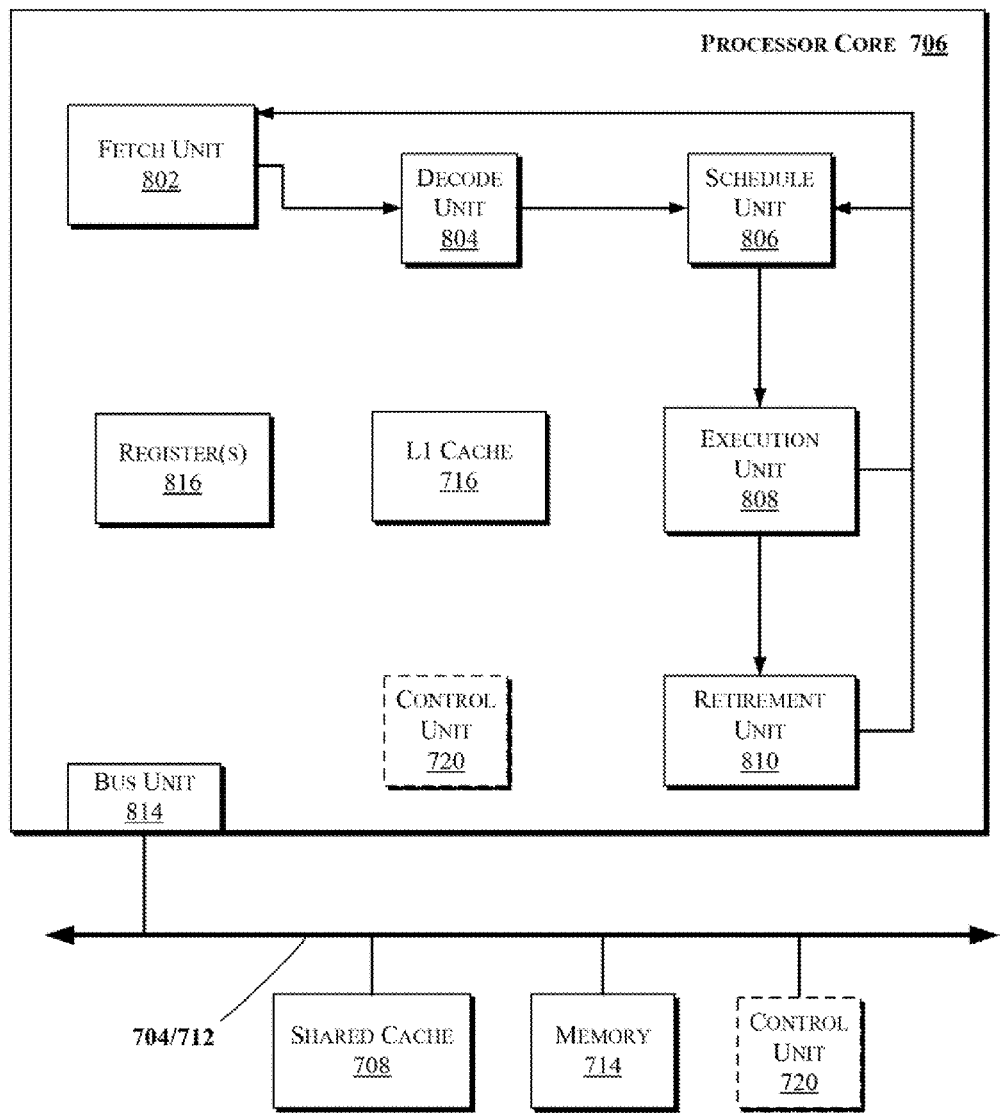

FIG. 8 illustrates a block diagram of portions of a processor core 706 and other components of a computing system, according to an embodiment of the invention. In one embodiment, the arrows shown in FIG. 8 illustrate the flow direction of instructions through the core 706. One or more processor cores (such as the processor core 706) may be implemented on a single integrated circuit chip (or die) such as discussed with reference to FIG. 7. Moreover, the chip may include one or more shared and/or private caches (e.g., cache 708 of FIG. 7), interconnections (e.g., interconnections 704 and/or 112 of FIG. 7), control units, memory controllers, or other components.

As illustrated in FIG. 8, the processor core 706 may include a fetch unit 802 to fetch instructions (including instructions with conditional branches) for execution by the core 706. The instructions may be fetched from any storage devices such as the memory 714. The core 706 may also include a decode unit 804 to decode the fetched instruction. For instance, the decode unit 804 may decode the fetched instruction into a plurality of uops (micro-operations).

Additionally, the core 706 may include a schedule unit 806. The schedule unit 806 may perform various operations associated with storing decoded instructions (e.g., received from the decode unit 804) until the instructions are ready for dispatch, e.g., until all source values of a decoded instruction become available. In one embodiment, the schedule unit 806 may schedule and/or issue (or dispatch) decoded instructions to an execution unit 808 for execution. The execution unit 808 may execute the dispatched instructions after they are decoded (e.g., by the decode unit 804) and dispatched (e.g., by the schedule unit 806). In an embodiment, the execution unit 808 may include more than one execution unit. The execution unit 808 may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit 808.

Further, the execution unit 808 may execute instructions out-of-order. Hence, the processor core 706 may be an out-of-order processor core in one embodiment. The core 706 may also include a retirement unit 810. The retirement unit 810 may retire executed instructions after they are committed. In an embodiment, retirement of the executed instructions may result in processor state being committed from the execution of the instructions, physical registers used by the instructions being de-allocated, etc.

The core 706 may also include a bus unit 714 to enable communication between components of the processor core 706 and other components (such as the components discussed with reference to FIG. 8) via one or more buses (e.g., buses 804 and/or 812). The core 706 may also include one or more registers 816 to store data accessed by various components of the core 706 (such as values related to power consumption state settings).

Furthermore, even though FIG. 7 illustrates the control unit 720 to be coupled to the core 706 via interconnect 812, in various embodiments the control unit 720 may be located elsewhere such as inside the core 706, coupled to the core via bus 704, etc.

Figure 9:
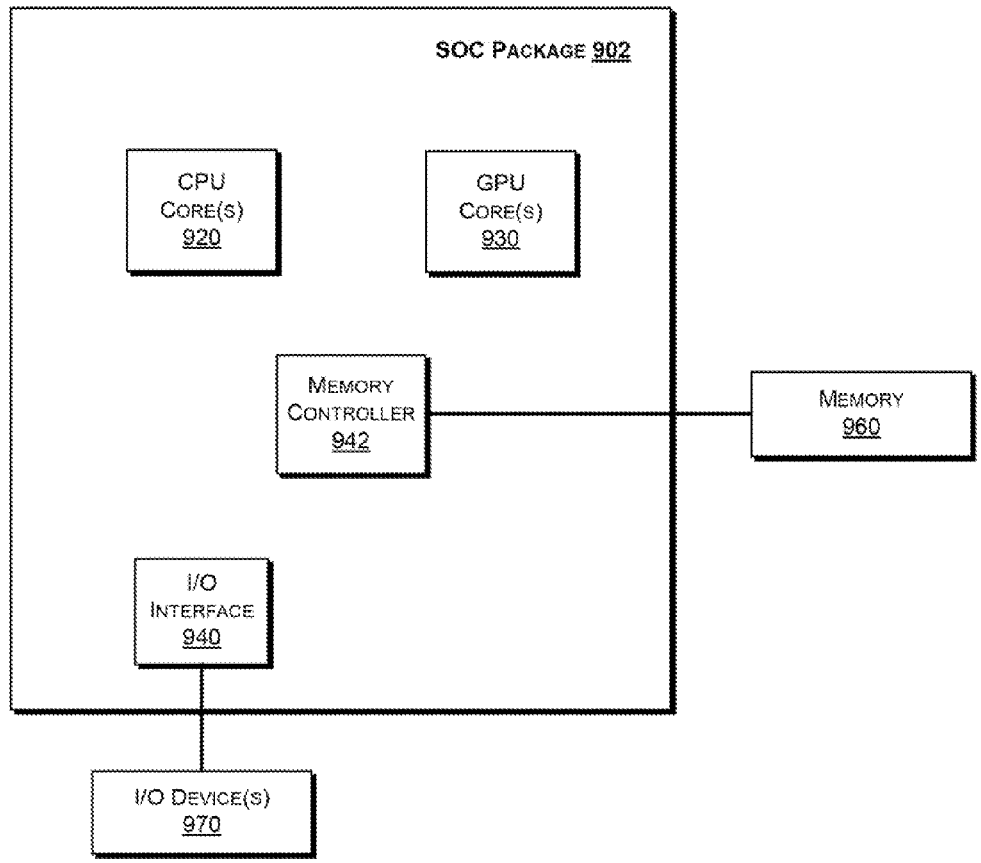

In some embodiments, one or more of the components discussed herein can be embodied as a System On Chip (SOC) device. FIG. 9 illustrates a block diagram of an SOC package in accordance with an embodiment. As illustrated in FIG. 9, SOC 902 includes one or more Central Processing Unit (CPU) cores 920, one or more Graphics Processor Unit (GPU) cores 930, an Input/Output (I/O) interface 940, and a memory controller 942. Various components of the SOC package 902 may be coupled to an interconnect or bus such as discussed herein with reference to the other figures. Also, the SOC package 902 may include more or less components, such as those discussed herein with reference to the other figures. Further, each component of the SOC package 902 may include one or more other components, e.g., as discussed with reference to the other figures herein. In one embodiment, SOC package 902 (and its components) is provided on one or more Integrated Circuit (IC) die, e.g., which are packaged into a single semiconductor device.

As illustrated in FIG. 9, SOC package 902 is coupled to a memory 960 (which may be similar to or the same as memory discussed herein with reference to the other figures) via the memory controller 942. In an embodiment, the memory 960 (or a portion of it) can be integrated on the SOC package 902.

The I/O interface 940 may be coupled to one or more I/O devices 970, e.g., via an interconnect and/or bus such as discussed herein with reference to other figures. I/O device(s) 970 may include one or more of a keyboard, a mouse, a touchpad, a display, an image/video capture device (such as a camera or camcorder/video recorder), a touch screen, a speaker, or the like.

Figure 10:
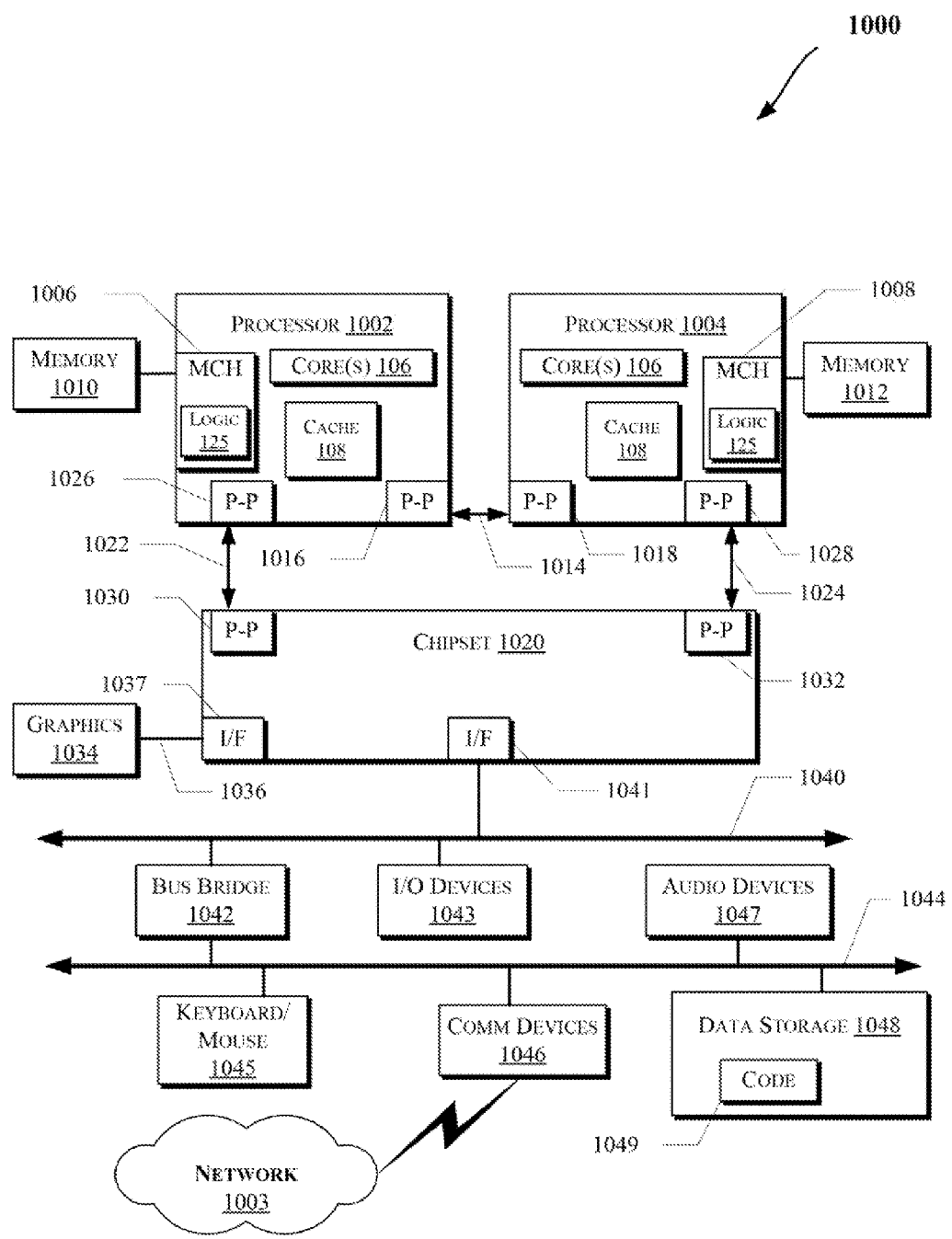

FIG. 10 illustrates a computing system 1000 that is arranged in a point-to-point (PtP) configuration, according to an embodiment of the invention. In particular, FIG. 10 shows a system where processors, memory, and input/output devices are interconnected by a number of point-to-point interfaces. The operations discussed with reference to FIG. 2 may be performed by one or more components of the system 1000.

As illustrated in FIG. 10, the system 1000 may include several processors, of which only two, processors 1002 and 1004 are shown for clarity. The processors 1002 and 1004 may each include a local memory controller hub (MCH) 1006 and 1008 to enable communication with memories 1010 and 1012. MCH 1006 and 1008 may include the memory controller 120 and/or logic 125 of FIG. 1 in some embodiments.

In an embodiment, the processors 1002 and 1004 may be one of the processors 702 discussed with reference to FIG. 7. The processors 1002 and 1004 may exchange data via a point-to-point (PtP) interface 1014 using PtP interface circuits 1016 and 1018, respectively. Also, the processors 1002 and 1004 may each exchange data with a chipset 1020 via individual PtP interfaces 1022 and 1024 using point-to-point interface circuits 1026, 1028, 1030, and 1032. The chipset 1020 may further exchange data with a high-performance graphics circuit 1034 via a high-performance graphics interface 1036, e.g., using a PtP interface circuit 1037.

As shown in FIG. 10, one or more of the cores 106 and/or cache 108 of FIG. 1 may be located within the processors 902 and 904. Other embodiments of the invention, however, may exist in other circuits, logic units, or devices within the system 900 of FIG. 9. Furthermore, other embodiments of the invention may be distributed throughout several circuits, logic units, or devices illustrated in FIG. 9.

The chipset 920 may communicate with a bus 940 using a PtP interface circuit 941. The bus 940 may have one or more devices that communicate with it, such as a bus bridge 942 and I/O devices 943. Via a bus 944, the bus bridge 943 may communicate with other devices such as a keyboard/mouse 945, communication devices 946 (such as modems, network interface devices, or other communication devices that may communicate with the computer network 803), audio I/O device, and/or a data storage device 948. The data storage device 948 (which may be a hard disk drive or a NAND flash based solid state drive) may store code 949 that may be executed by the processors 902 and/or 904.

The following examples pertain to further embodiments.

Example 1 is an electronic device comprising a processor and a memory control logic to receive data from a remote memory device, store the data in a local cache memory, receive an error correction code indicator associated with the data and implement a data management policy in response to the error correction code indicator.

The electronic device may further comprise logic to receive, from a host device, a request for the data and generate, in response to the request from the host device, a request for the data from the remote memory device. The electronic device may further comprise logic to store the data received from the remote memory device in a local cache.

The electronic device may further comprise logic to determine whether the error correction code indicator indicates that the data retrieved from the remote memory device was retrieved without error, and in response to a determination that the data was retrieved without error, return the data to the host device. The electronic device may further comprise logic to determine whether the error correction code indicator indicates that the data retrieved from the remote memory device includes at least one error, and in response to a determination that the data includes at least one error, to delete the data from the local cache memory and transmit a new request for the data from the remote memory device.

Example 2 is a memory controller comprises logic to receive data from a remote memory device, store the data in a local cache memory, receive an error correction code indicator associated with the data; and implement a data management policy in response to the error correction code indicator.

The memory controller may further comprise logic to receive, from a host device, a request for the data, determine that the data is stored in the remote memory device, and generate, in response to the request from the host device, a request for the data from the remote memory device.

The memory controller may further comprise logic to store the data received from the remote memory device in a local cache. The memory controller may further comprise logic to determine whether the error correction code indicator indicates that the data retrieved from the remote memory device was retrieved without error and in response to a determination that the data was retrieved without error, return the data to the host device.

The memory controller may further comprise logic to determine whether the error correction code indicator indicates that the data retrieved from the remote memory device includes at least one error, and in response to a determination that the data includes at least one error, to delete the data from the local cache memory, and transmit a new request for the data from the remote memory device.

Example 3 is an apparatus comprising a memory device having one or more memory cells, a memory control logic to receive a request from a requestor via a data bus for data stored in the one or more memory cells and retrieve the data from the one or more memory cells, determine whether the data bus is in an idle state, and in response to a determination that the data bus is in an idle state transmit the data from the apparatus to the requestor on the data bus, initiate an error correction code algorithm after the data has begun transmission, and transmit an error correction code indicator to the requestor via the data bus.

The apparatus may comprise memory control logic to estimate a delay time required to execute the error correction control algorithm and delay transmitting data from the apparatus to the requestor by the delay time. The apparatus may comprise memory control logic to transmit a retry error correction code indicator to the requestor when the error correction code algorithm indicates a read error in the data.

The apparatus may comprise memory control logic to correct the data and transmit corrected data to the requestor via the data bus. In response to a determination that the data bus is not in an idle state, the error correction code algorithm is implemented before the data is transmitted from the apparatus to the requestor on the data bus.

In example 4, a controller comprises logic to receive a request from a requestor via a data bus for data stored in the one or more memory cells, retrieve the data from the one or more memory cells, determine whether the data bus is in an idle state, and in response to a determination that the data bus is in an idle state, transmit the data from the apparatus to the requestor on the data bus, initiate an error correction code algorithm after the data has begun transmission, and transmit an error correction code indicator to the requestor via the data bus.

The controller may comprise memory control logic to estimate a delay time required to execute the error correction control algorithm and delay transmitting data from the apparatus to the requestor by the delay time. The controller may comprise memory control logic to transmit a retry error correction code indicator to the requestor when the error correction code algorithm indicates a read error in the data.

The controller may comprise memory control logic to correct the data and transmit corrected data to the requestor via the data bus. In response to a determination that the data bus is not in an idle state, the error correction code algorithm is implemented before the data is transmitted from the apparatus to the requestor on the data bus.

In various embodiments of the invention, the operations discussed herein, e.g., with reference to FIGS. 1-9, may be implemented as hardware (e.g., circuitry), software, firmware, microcode, or combinations thereof, which may be provided as a computer program product, e.g., including a tangible (e.g., non-transitory) machine-readable or computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed herein.

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. A remote memory apparatus comprising:
   a nonvolatile memory; and
   a remote memory controller comprising logic to:
      receive a data request from a requestor via a data bus for data stored in the nonvolatile memory;
      retrieve the data from the nonvolatile memory;
      determine whether the data bus is in an idle state; and
      in response to a determination that the data bus is in an idle state, the logic is further configured to:
         begin sending the data from the remote memory controller to the requestor over the data bus while the data is being retrieved from the nonvolatile memory to the remote memory controller;

initiate an error correction code algorithm on the data while the data is being sent to the requestor; and send an error correction code indicator to the requestor over the data bus; or in response to a determination that the data bus is not in an idle state, the logic is further configured to:

initiate an error correction code algorithm on the data;

correct any errors in the data; and subsequently send the data to the requestor.

2. The apparatus of claim 1, wherein, in response to the determination that the data bus is in an idle state, the logic is further configured to:

estimate a delay time needed to execute the error correction code algorithm; and delay the beginning of sending the data from the remote memory controller to the requestor by the delay time.

3. The apparatus of claim 2, wherein, in response to the error correction code indicator indicating that the data contains at least one error, the logic is further configured to:

send, to the requestor, a retry error correction code indicator;

correct the at least one error; and send the corrected data over the data bus to the requestor.

4. The apparatus of claim 3, wherein the nonvolatile memory comprises three dimensional (3D) cross point memory.

5. A memory controller comprising logic to:

receive a request from a requestor via a data bus for data stored in a nonvolatile memory;

retrieve the data from the nonvolatile memory;

determine whether the data bus is in an idle state; and in response to a determination that the data bus is in an idle state, the logic is further configured to;

begin transmission of the data from the memory controller to the requestor over the data bus;

initiate an error correction code algorithm after the data has begun transmission; and transmit an error correction code indicator to the requestor over the data bus; or in response to a determination that the data bus is not in an idle state, the logic is further configured to:

initiate an error correction code algorithm on the data;

correct any errors in the data; and subsequently send the data to the requestor.

6. The memory controller of claim 5, wherein, in response to the determination that the data bus is in an idle state, the logic is further configured to:

estimate a delay time needed to execute the error correction control algorithm; and delay beginning transmission of the data to the requestor by the delay time.

7. The memory controller of claim 5, wherein, in response to the error correction code indicator indicating that the data contains at least one error, the logic is further configured to:

transmit, to the requestor, a retry error correction code indicator;

correct the at least one error; and send the corrected data over the data bus to the requestor.

8. The memory controller of claim 7, wherein the nonvolatile memory comprises three dimensional (3D) cross point memory.

* * * * *